United States Patent
Ichikawa (10) Patent No.: US 7,534,027 B2
(45) Date of Patent: May 19, 2009

(54) PLANAR LIGHT SOURCE AND LIQUID CRYSTAL DISPLAY USING THE SAME

(75) Inventor: Koji Ichikawa, Kumamoto (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/278,484

(22) Filed: Apr. 3, 2006

(65) Prior Publication Data
US 2006/0268573 A1    Nov. 30, 2006

(30) Foreign Application Priority Data
May 27, 2005    (JP)    ............ 2005-155157

(51) Int. Cl.
*G02B 26/02* (2006.01)
*F21V 14/08* (2006.01)

(52) U.S. Cl. .............. 362/621; 362/279; 362/321; 362/342; 362/516; 362/609; 362/614; 359/232

(58) Field of Classification Search ......... 362/621–623, 362/600, 614, 608–609, 489, 488, 516, 279–281, 362/290, 321, 341–342; 359/230–232
See application file for complete search history.

(56) References Cited

U.S. PATENT DOCUMENTS
2006/0050535 A1*  3/2006  Chang ............... 362/621

FOREIGN PATENT DOCUMENTS

| JP | 6-222363 | 8/1994 |
|----|----------|--------|
| JP | 2000-214462 | 8/2000 |
| KR | 2000-0003311 | 1/2000 |

\* cited by examiner

*Primary Examiner*—Jong-Suk (James) Lee
*Assistant Examiner*—Leah S Lovell
(74) *Attorney, Agent, or Firm*—Oblon, Spivak, McClelland, Maier & Neustadt, P.C.

(57) ABSTRACT

A planar light source of the present invention includes a light source part, a light guide part for guiding light emitted from the light source part to form planar emission of the light, and a reflector for reflecting light emitted from the light source part to allow the light to enter the light guide part. The reflector has a member for controlling the amount of reflected light capable of controlling the amount of reflected light.

9 Claims, 8 Drawing Sheets

PLANAR LIGHT SOURCE AND LIQUID CRYSTAL DISPLAY USING THE SAME

BACKGROUND OF THE INVENTION

1. Field of the Invention

The present invention relates to a planar light source and a liquid crystal display using this planar light source. More specifically, the present invention relates to a planar light source capable of controlling brightness and a liquid crystal display using this planar light source.

2. Description of the Background Art

In many cases, a planar light source is intended for use as a backlight of a transparent liquid crystal display. A cold cathode fluorescent lamp (CCFL) is generally used as a light source part of this planar light source. An inverter is indispensably required to light the cold cathode fluorescent lamp.

An inverter is used to control the brightness of the planar light source. However, due to limitations of the characteristics of the cold cathode fluorescent lamp, only about 30 percent of maximum brightness can be obtained by the inverter alone. A liquid crystal display intended for use in a shipboard or in a car-mounted system is required to provide a wide range of brightness control in order to ensure safety in the nighttime.

As a result of the use in various environments, a liquid crystal display has been used in various temperatures. The cold cathode fluorescent lamp is unlikely to light up at a low temperature and in a low-current condition. The cold cathode fluorescent lamp, even when it lights up in these conditions, is subjected to the bias of encapsulated mercury, and hence is difficult to light up in a usual mode. Thus the planar light source suffers from a limited range of brightness control due to a low temperature.

In response, according to the technique introduced in Patent Application Laid-Open No. 6-222363 (1994), a light amount control member is interposed between a light source and a light guide plate to broaden the range of brightness control. More specifically, light emitted from the light source is absorbed by the light amount control member. Then the amount of light entering the light guide plate is controlled to thereby broaden the range of brightness control.

When the light amount control member is arranged between the light source and the light guide plate as taught in Patent Application Laid-Open No. 6-222363 (1994), the range of brightness control is broadened on the low brightness side while lowering maximum brightness. Namely, the light amount control member absorbs not a little amount of light even when the light amount control member is formed by a material with high transmittance. As a result, the existence of the light amount control member lowers maximum brightness.

SUMMARY OF THE INVENTION

It is an object of the present invention to provide a planar light source capable of broadening the range of brightness control with substantially no lowering of maximum brightness. It is also an object of the present invention to provide a liquid crystal display using this planar light source.

According to the present invention, the planar light source includes a light source part, a light guide part for guiding light emitted from the light source part to form planar emission of the light, and a reflector for reflecting light emitted from the light source part to allow the light to enter the light guide part. The reflector has a member for controlling the amount of reflected light capable of controlling the amount of reflected light.

The planar light source of the present invention is provided with the member for controlling the amount of reflected light capable of controlling the amount of reflected light. Thus the range of brightness control can be broadened.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
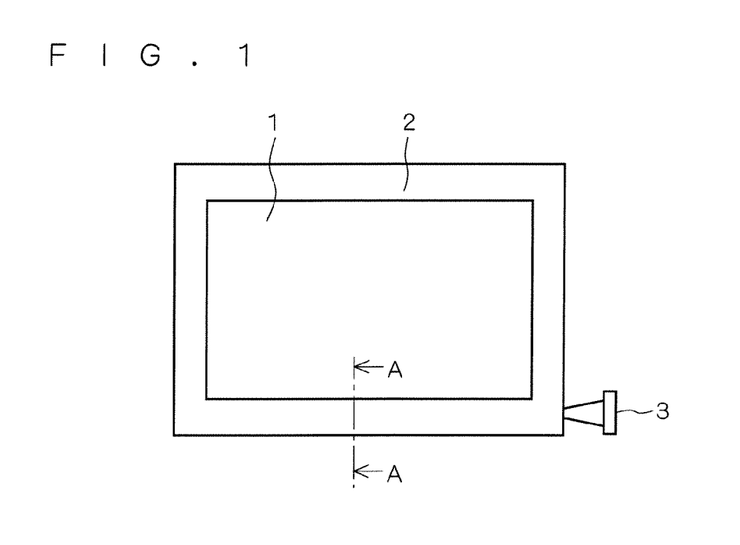
FIG. 1 is a plan view of a planer light source according to the present invention.

FIG. 1 is a plan view of a generally-used planar light source. The planar light source shown in FIG. 1 includes a light guide plate 1, an upper frame 2 surrounding the light guide plate 1, and a cold cathode fluorescent lamp 3 arranged at the bottom side of the upper frame 2 (in FIG. 1, only a wiring for connecting the cold cathode fluorescent lamp 3 is shown). The light guide plate 1 is formed by a transparent material such as acrylic resin. Light emitted from a light source part is guided by the light guide plate 1 to form planar light emission. The planar light source shown in FIG. 1 uses the cold cathode fluorescent lamp 3 as a light source part, while allowing light to enter from the side edge of the light guide plate 1.

Figure 2:
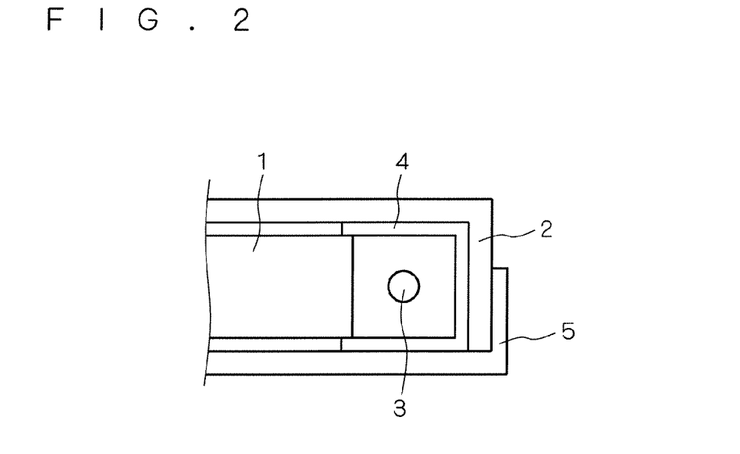
FIG. 2 is a partial sectional view of the planar light source according to the present invention.

FIG. 2 is a sectional view taken along a line A-A in FIG. 1. With reference to FIG. 2, the cold cathode fluorescent lamp 3 is arranged near the side edge of the light guide plate 1, and a reflector 4 is provided to cover the light guide plate 1. The upper frame 2 and a lower frame 5 hold the light guide plate 1, the reflector 4 and the like. The light guide plate 1 is provided with a reflective sheet on the rear side and an optical sheet or the like on the front side, which has no direct relation to the present invention and will not be discussed.

Figure 3:
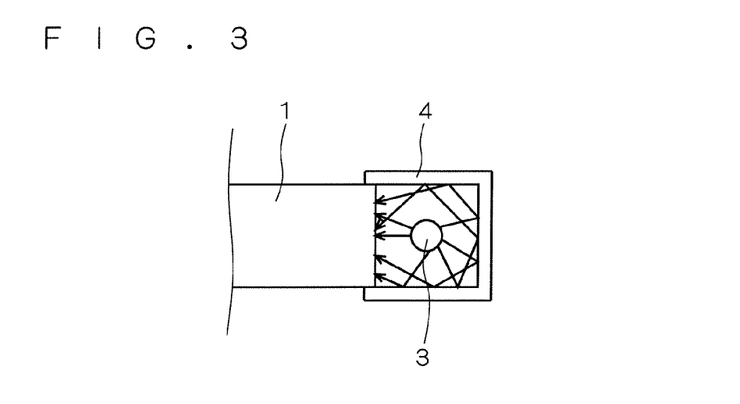
FIG. 3 shows how light emitted from a cold cathode fluorescent lamp enters a light guide plate.

Light emitted from the cold cathode fluorescent lamp 3 to travel in a direction toward the light guide plate 1 directly enters the light guide plate 1. Light emitted from the cold cathode fluorescent lamp 3 to travel in a direction other than the light guide plate 1 is reflected by the reflector 4, thereafter entering the light guide plate 1. FIG. 3 shows how light emitted from the cold cathode fluorescent lamp 3 enters the light guide plate 1. In FIG. 3, optical paths are shown by arrows.

In the planar light source of the present invention, the reflector 4 is provided with a member for controlling the amount of reflected light to broaden the range of brightness control. That is, light emitted to travel in a direction other than the light guide plate 1 is reflected by the reflector 4 as shown in FIG. 3. The light reflected by the reflector 4 is controlled by the member for controlling the amount of reflected light to thereby broaden the range of brightness control. In the following description of a planar light source according to a first preferred embodiment of the present invention, the member for controlling the amount of reflected light provided to the reflector 4 will be discussed.

Figure 4A:
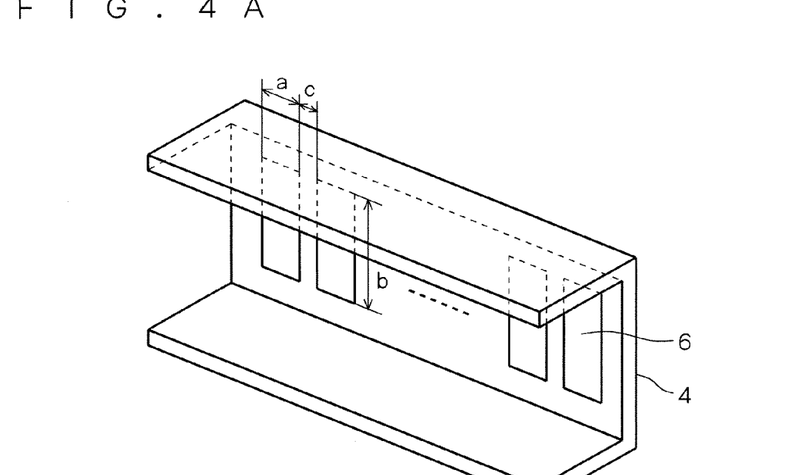
FIGS. 4A and 4B are perspective views each showing a member for controlling the amount of reflected light according to a first preferred embodiment of the present invention.

FIG. 4A is a perspective view of the reflector 4 according to the first preferred embodiment. The reflector 4 shown in FIG. 4A is provided with a plurality of slits 6 on one surface. Although not shown, the surface with the slits 6 faces the side edge of the light guide plate 1. The slits 6 each have a width a, a height b, and a space c from an adjacent slit.

Figure 4B:
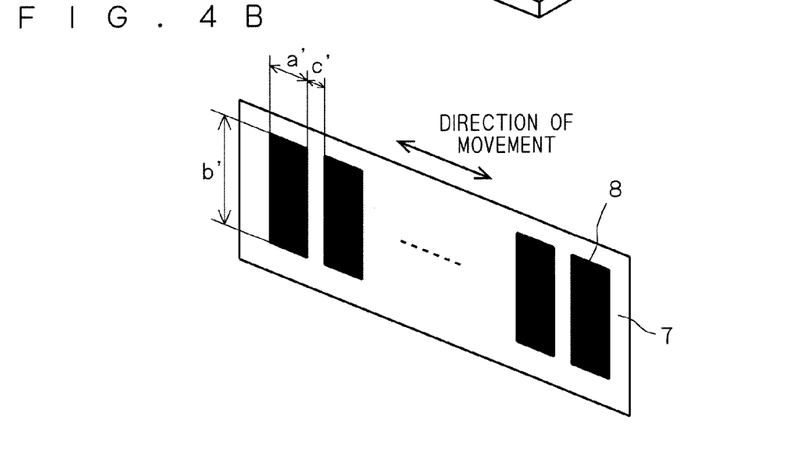

FIG. 4B shows a reflective plate 7 to be arranged on the rear surface of the reflector 4. The reflective plate 7 is provided with light absorbers 8 that are substantially the same in structure as the slits 6. The light absorbers 8 serve as anti-reflective parts. Light entering the light absorbers 8 is not reflected, and does not enter the light guide plate 1 accordingly. The light absorbers 8 each have a width a', a height b', and a space c' from an adjacent light absorber. Except for the existence of the light absorbers 8, the reflective plate 7 is formed by the same material as that of the reflector 4, and has the same characteristics such as reflectance as those of the reflector 4.

Figure 5:
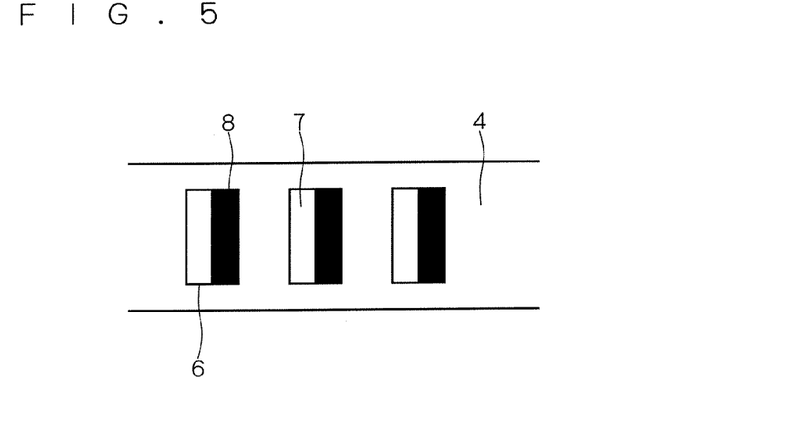
FIG. 5 shows the member for controlling the amount of reflected light according to the first preferred embodiment.

The member for controlling the amount of reflected light of the first preferred embodiment is so configured that the reflective plate 7 is arranged on the rear surface of the reflector 4 with the slits 6, while being movable so that the relative positions of the slits 6 and the light absorbers 8 are changed. Like a conventional reflector with no slit 6, when portions of the reflective plate 7 except the light absorbers 8 overlap the slits 6, the reflector 4 is capable of effectively reflecting all the light emitted from the cold cathode fluorescent lamp 3. On the other hand, when the slits 6 partially overlap the light absorbers 8 as shown in FIG. 5, the reflector 4 changes the amount of reflected light at the slits 6. Thus according to the member for controlling the amount of reflected light of the first preferred embodiment, the light absorbers 8 arbitrarily overlap the slits 6 to control the amount of reflected light at the reflector 4, thereby broadening the range of brightness control of the planar light source.

Figure 6:
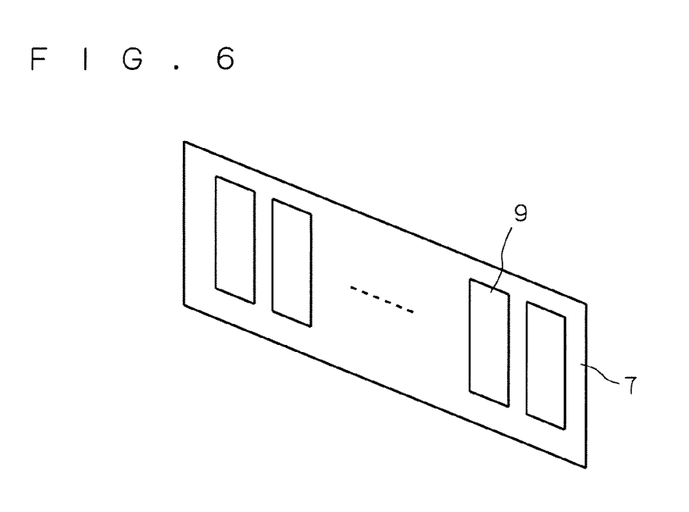
FIG. 6 is a perspective view of a reflective plate according to the first preferred embodiment.
Figure 7:
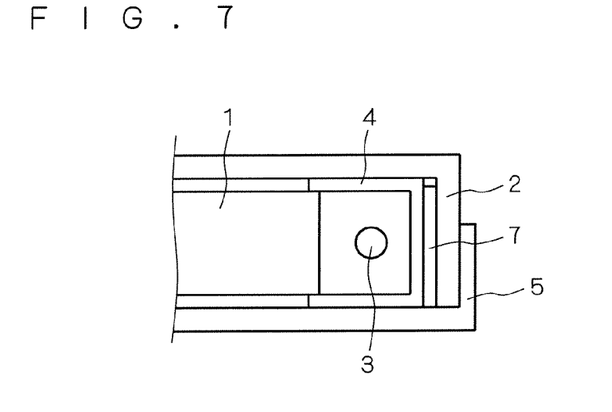
FIGS. 7 and 8 are sectional views each partially showing the planar light source according to the first preferred embodiment.

The shape of the reflective plate 7 is not limited to that shown in FIG. 4B. FIG. 6 shows an alternative structure of the reflective plate 7 in which the light absorbers 8 are replaced by slits 9. The reflective plate 7 provided with the slits 9 is arranged on the rear surface of the reflector 4, and is movable so that the relative positions of the slits 6 and the slits 9 are changed. When the slits 6 and the slits 9 overlap each other, light emitted from the cold cathode fluorescent lamp 3 passes through the reflector 4 and the reflective plate 7 accordingly. When the upper frame 2 has a color that absorbs light, light passing through the slits 6 and 9 is absorbed by the upper frame 2 to thereby realize brightness control of the planar light source.

Each of the slits 9 also has the width a', height b', and space c' from an adjacent slit. Except for the existence of the slits 9, the reflective plate 7 is formed by the same material as that of the reflector 4, and has the same characteristics such as reflectance as those of the reflector 4.

Figure 8:
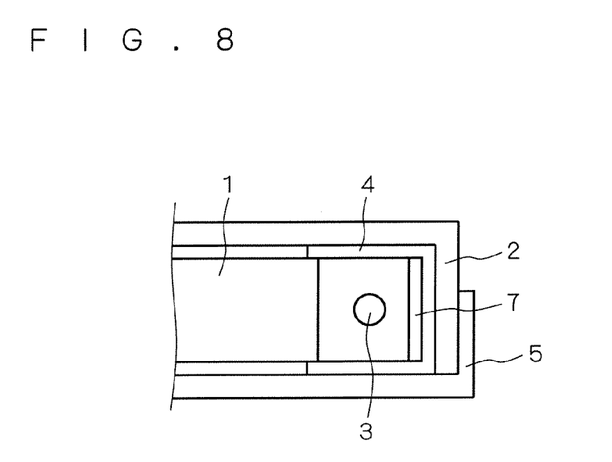

As discussed above, the reflective plate 7 is arranged on the rear surface of the reflector 4. Namely, the reflective plate 7 is held between the reflector 4 and the upper frame 2. The reflective plate 7 with the slits 9 may alternatively be arranged between the reflector 4 and the cold cathode fluorescent lamp 3 as shown in FIG. 8. This is because the reflective plate 7 with the slits 9 has no light absorber 8, so there is no need to cover the light absorber 8 by any member.

Figure 9:
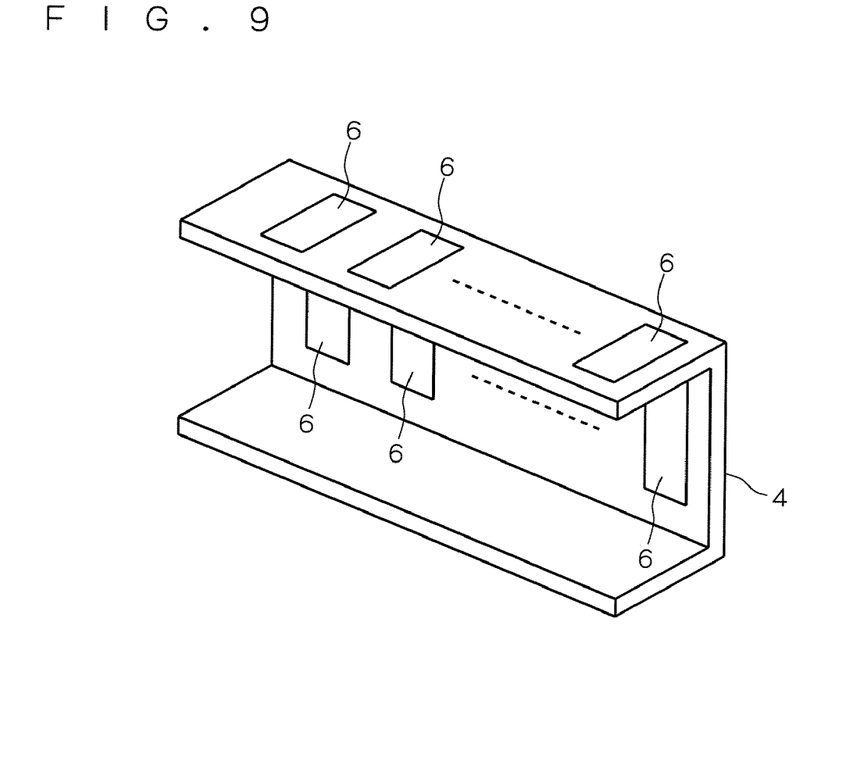
FIG. 9 is a perspective view of a reflector according to the first preferred embodiment.

In the above-discussed example, the slits 6 are provided to only one surface (surface facing the side edge of the light guide plate 1) of the reflector 4. Alternatively, in the present invention, the slits 6 may be given to another surface of the reflector 4. FIG. 9 is a perspective view of the reflector 4 given the slits 6 on it two surfaces. As shown in FIG. 9, the upper surface (surface contacting the upper frame 2) as well as the surface shown in FIG. 4A of the reflector 4 is provided with the slits 6.

Figure 10:
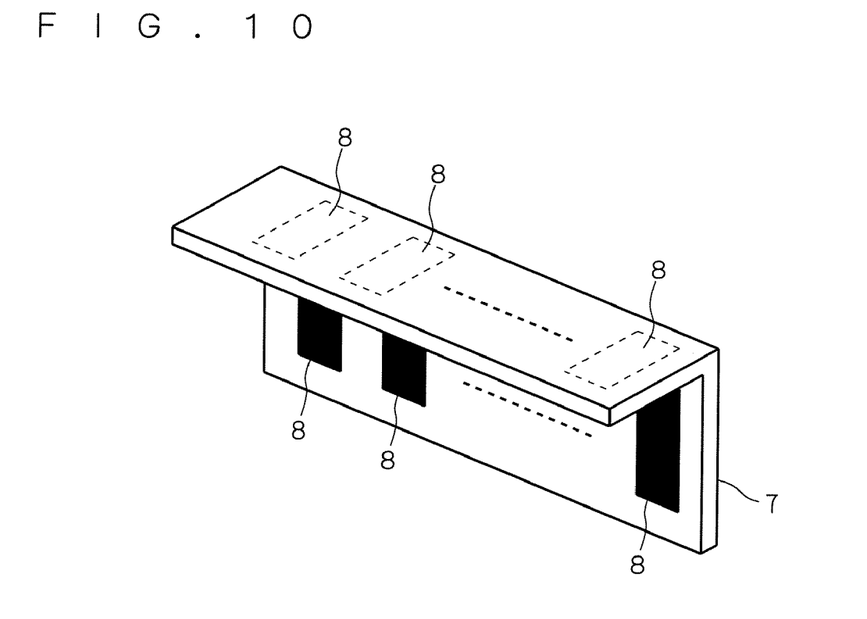
FIG. 10 is a perspective view of the reflective plate according to the first preferred embodiment.

When the reflector 4 shown in FIG. 9 is to be incorporated into the planar light source, the reflective plate 7 as shown in FIG. 10 should be employed that is so formed to cover two surfaces of the reflector 4. The reflective plate 7 of FIG. 10 is formed by joining two reflective plates 7 shown in FIG. 4B in the form of an L-shape. The reflective plate 7 shown in FIG. 10 is given the light absorbers 8 on the respective surfaces that are the same in shape as those shown in FIG. 4B. Hence, when the reflective plate 7 shown in FIG. 10 is combined with the reflector 4 shown in FIG. 9, the amount of reflected light is controlled within a broader range as compared to the use of the reflector 4 that is given the slits 6 on one surface. As a result, the planar light source is capable of controlling brightness within a broader range.

The reflective plate 7 of FIG. 10 is formed by joining two reflective plates 7 shown in FIG. 4B in the form of an L-shape. Alternatively, two reflective plates 7 with the slits 9 shown in FIG. 6 may be joined in the form of an L-shape. Further, two surfaces of the reflector 4 are not necessarily covered with the reflective plate 7 in a manner as shown in FIG. 10. Alternatively, two independent reflective plates 7 may separately cover two surfaces of the reflector 4, while being separately operable.

Although not shown, the slits 6 may be provided to three surfaces of the reflector 4. In this case, the reflective plates 7 are provided in correspondence with the slits 6 on the respective surfaces to thereby provide a broader range of brightness control of the planar light source.

Figure 11:
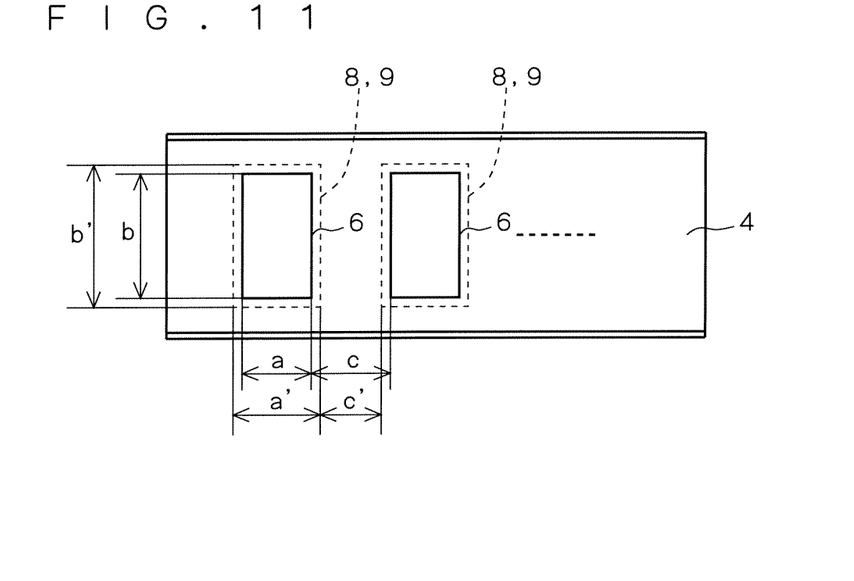
FIG. 11 shows the member for controlling the amount of reflected light according to the first preferred embodiment.

Next, the relationship between the slits 6 of the reflector 4 and the light absorbers 8 or slits 9 of the reflective plate 7 is discussed. FIG. 11 shows the reflector 4 with the reflective plate 7 arranged on its rear surface as viewed from the cold cathode fluorescent lamp 3 (from a reflective surface). Two slits 6 are shown in the example of FIG. 11. The slits 6 each have the width a, height b, and space c from the adjacent slit.

The light absorbers 8 or slits 9 each have the width a', height b', and space c' from the adjacent light absorber or adjacent slit.

In the combination of the reflector 4 and the reflective plate 7, the present invention preferably satisfies the following relations in order to realize most effective control of the amount of reflected light:

$a \leq a'$;

$b \leq b'$; and $a \leq c \leq c'$.

That is, the shape of the slits 6 is preferably the same as or slightly smaller than the shape of the light absorbers 8 or slits 9. When the slits 6 are provided to two or three surfaces of the reflector 4, the shape of the slits 6 and the shape of the light absorbers 8 or slits 9 preferably satisfy the above-mentioned relations. In the foregoing description of the first preferred embodiment, the slits 6 and the light absorbers 8 or slits 9 are formed in the shape of rectangles. However, the slits 6 and the light absorbers 8 or slits 9 may have alternative shapes.

As discussed, in the planar light source of the first preferred embodiment, the member for controlling the amount of reflected light is configured by the reflector 4 including the slits 6, and the reflective plate 7 provided with the light absorbers 8 or slits 9. Thus the amount of reflected light can be arbitrarily controlled to thereby broaden the range of brightness control.

In the planar light source of the first preferred embodiment, the reflective plate 7 is formed by the same material as that of reflector 4, or by a material having the same reflection characteristic as that of the reflector 4. Thus the range of brightness control can be broadened with substantially no lowering of maximum brightness.

In the planar light source of the first preferred embodiment, the cold cathode fluorescent lamp 3 is arranged near the side edge of the light guide plate 1. Alternatively, as long as light emitted from the cold cathode fluorescent lamp 3 is reflected by the reflector 4 and then enters the light guide plate 1, the cold cathode fluorescent lamp 3 may be arranged directly below the light guide plate 1.

Second Preferred Embodiment

Figure 12:
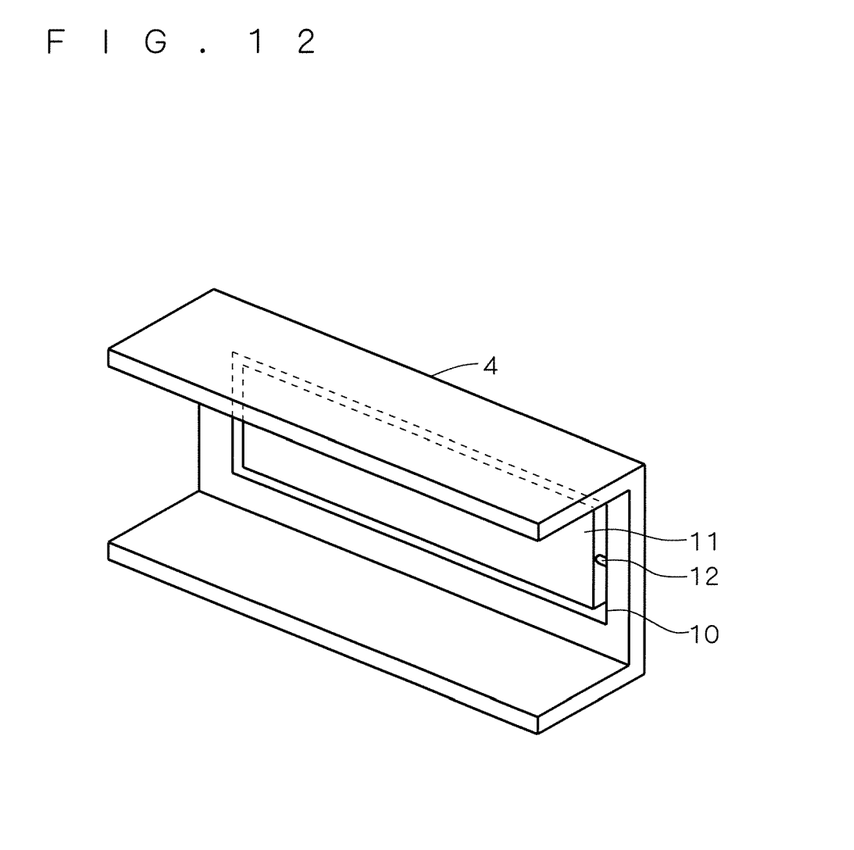
FIG. 12 is a perspective view of a member for controlling the amount of reflected light according to a second preferred embodiment of the present invention.

In a planar light source of a second preferred embodiment of the present invention, a member for controlling the amount of reflected light is different from that of the first preferred embodiment. FIG. 12 is a perspective view of a reflector 4 according to the second preferred embodiment. The reflector 4 shown in FIG. 12 is given a window 10 on one surface. As shown in the sectional view of FIG. 13, the surface of the reflector 4 provided with the window 10 faces the side edge of the light guide plate 1.

The window 10 is provided with a reflective plate 11. The reflective plate 11 is fixed to an axis 12 arranged at the center of the window 10 and extending in parallel with the cold cathode fluorescent lamp 3. The reflective plate 11 is capable of rotating about the axis 12. The reflective plate 11 is formed by the same material as that of the reflector 4, and has the same characteristics such as reflectance as those of the reflector 4.

Figure 13:
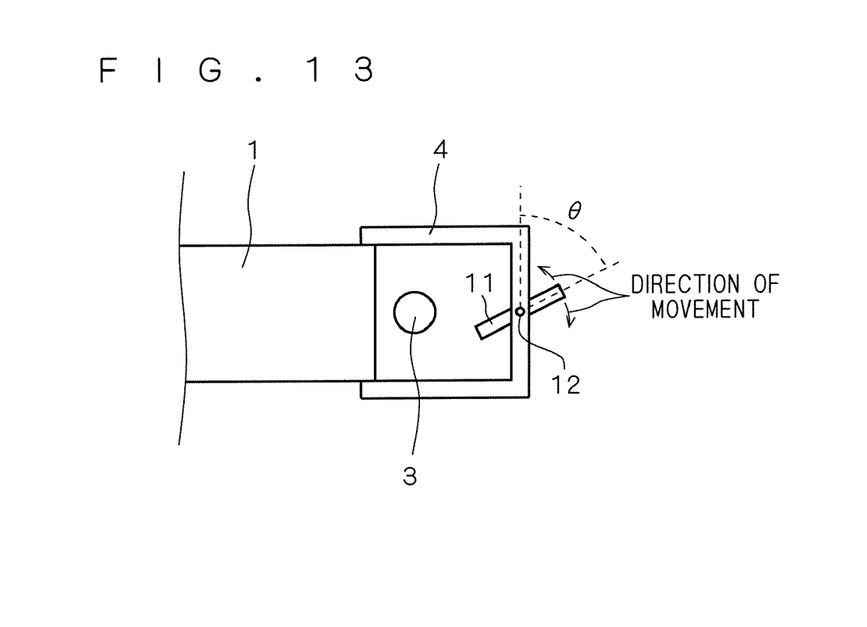
FIG. 13 is a partial sectional view of a planar light source according to the second preferred embodiment.

With reference to the sectional view of FIG. 13, assuming an angle formed by the reflective plate 11 and the window 10 as a rotation angle θ, the window 10 and the reflective plate 11 coincide with each other in the case of θ=0°, to thereby realize maximum reflectance. Like a conventional reflector with no window 10, the reflector 4 is capable of effectively reflecting all the light emitted from the cold cathode fluorescent lamp 3. When the rotation angle θ is 90° so the reflective plate 11 is arranged perpendicular to the window 10, light emitted from the cold cathode fluorescent lamp 3 is scarcely reflected by the reflective plate 11, resulting in minimum reflectance.

Thus by arbitrarily changing the rotation angle θ, the amount of reflected light is controlled to thereby vary the amount of light entering the light guide plate 1. That is, the amount of reflected light is controlled by arbitrarily changing the rotation angle θ, thereby broadening the range of brightness control. The reflective plate 11 is formed by a material that has been removed from the reflector 4 to form the window 10, leading to savings in material costs.

As discussed, in the planar light source of the second preferred embodiment, the member for controlling the amount of reflected light includes the window 10, and the reflective plate 11 fixed to the axis 12 of the window 10. Thus the amount of reflected light can be changed to thereby broaden the range of brightness control.

In the example of FIG. 12, the reflective plate 11 is fixed to the axis 12 arranged at the center of the window 10. However, the axis 12 may be arranged at an arbitrary position. Further, in the present invention, the reflective plate 11 covering the window 10 is required only to move. Hence, although not shown, the reflective plate 11 may alternatively be arranged on the rear surface of the window 10. In this case, the reflective plate 11 is moved in a vertical direction to change the amount of reflected light.

In the present invention, more than one window 10 and more than one reflective plate 11 may be provided to one surface of the reflector 4. Further, the window 10 and the reflective plate 11 may be provided to two or more surfaces of the reflector 4.

Third Preferred Embodiment

Figure 14:
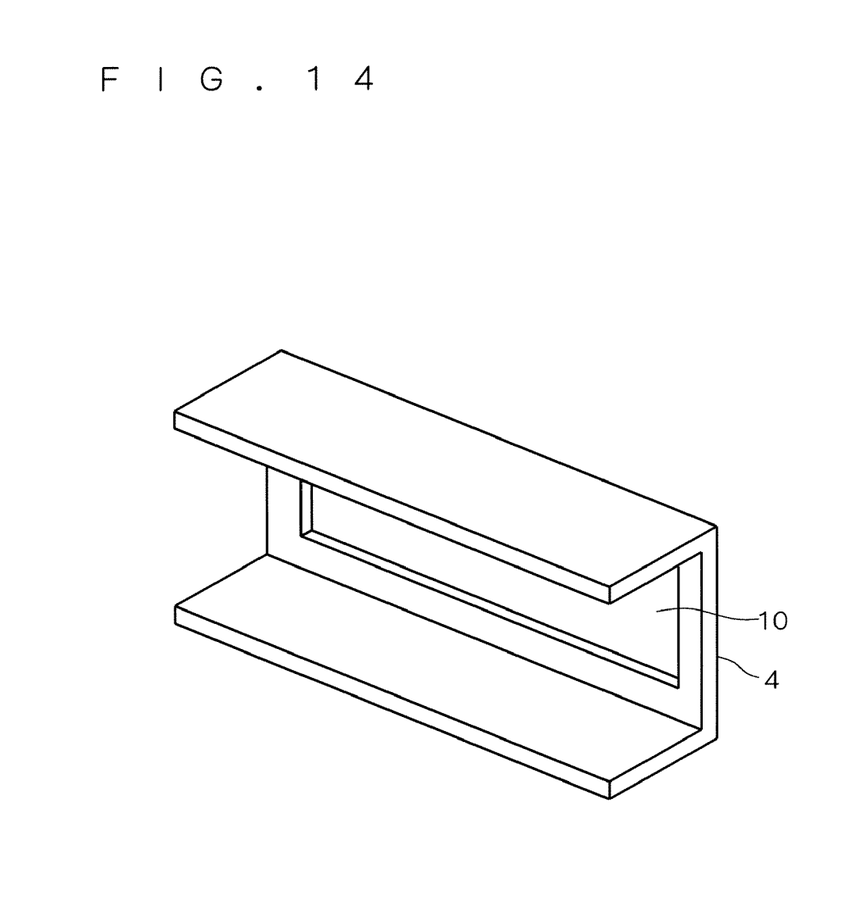
FIG. 14 is a perspective view of a reflector according to a third preferred embodiment of the present invention.
Figure 15:
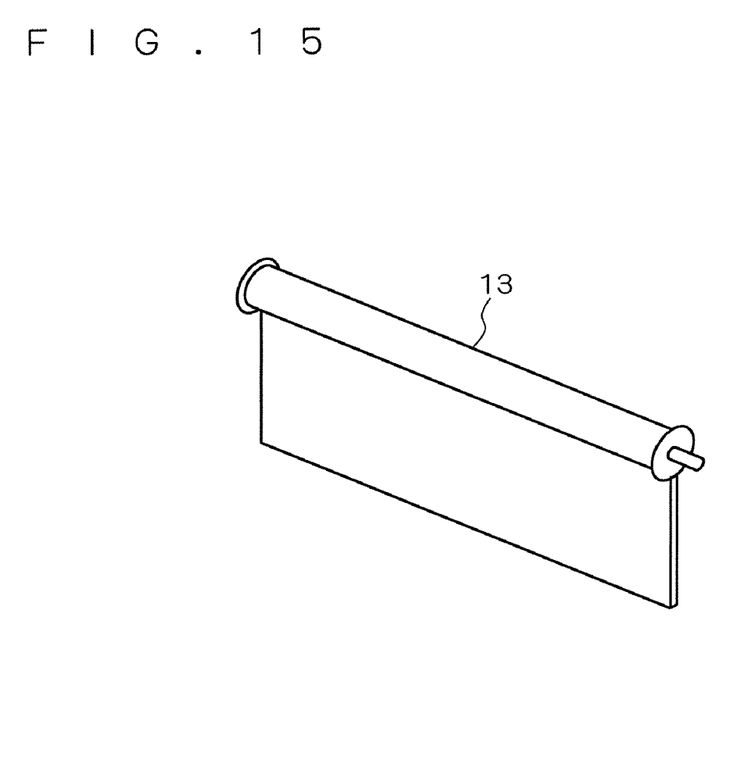
FIG. 15 is a perspective view of a reflective sheet according to the third preferred embodiment.

In a planar light source of a third preferred embodiment of the present invention, a member for controlling the amount of reflected light is different from that of the first preferred embodiment. According to the member for controlling the amount of reflected light of the third preferred embodiment, the window 10 is provided to one surface of the reflector 4 as shown in FIG. 14, and a roll-up reflective sheet 13 shown in FIG. 15 is attached to the window 10. The reflective sheet 13 is arranged on the rear surface of the window 10 (between the reflector 4 and the upper frame 2) as shown in FIG. 16.

Figure 16:
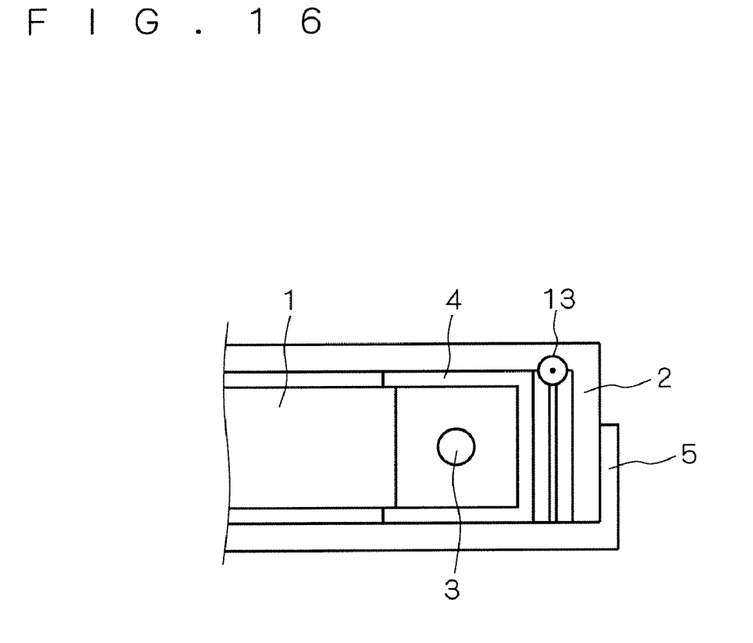
FIG. 16 is a partial sectional view of a planar light source according to the third preferred embodiment.

According to the member for controlling the amount of reflected light of the third preferred embodiment, the reflector 4 and the reflective sheet 13 are combined as shown in FIG. 16 and the amount of winding of the reflective sheet 13 is changed. As a result, the ratio of the area of the window 10 occupied by the reflective sheet 13 is changed to control the amount of reflected light. As an example, when the amount of winding of the reflective sheet 13 is controlled such that the reflective sheet 13 occupies half the area of the window 10, half the light emitted from the cold cathode fluorescent lamp 3 and entering the window 10 is reflected by the reflective sheet 13, whereas the other half passes through the window 10. When the upper frame 2 has a color that absorbs reflected light (such as black), the light passing through the window 10 is absorbed by the upper frame 2, whereby the reflective sheet 13 is allowed to control the amount of light reflected by the reflector 4.

The reflective sheet 13 is preferably formed by a material having the same reflection characteristic as that of the reflector 4. Further, the direction of winding of the reflective sheet 13 is not limited to a vertical direction. The reflective sheet 13 may be wound in a horizontal direction.

Figure 17:
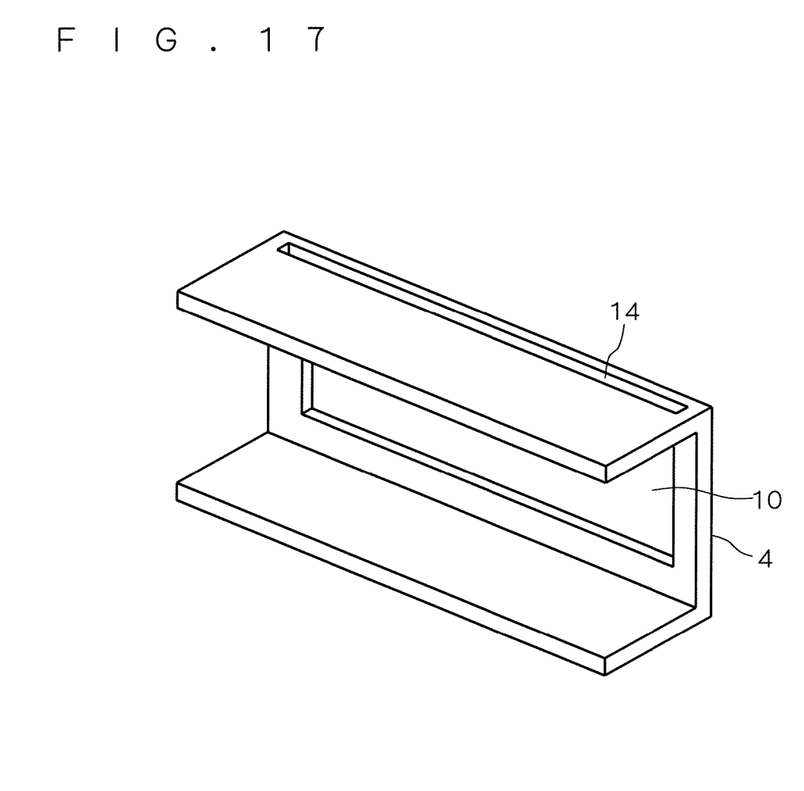
FIG. 17 is a perspective view of the reflector according to the third preferred embodiment.
Figure 18:
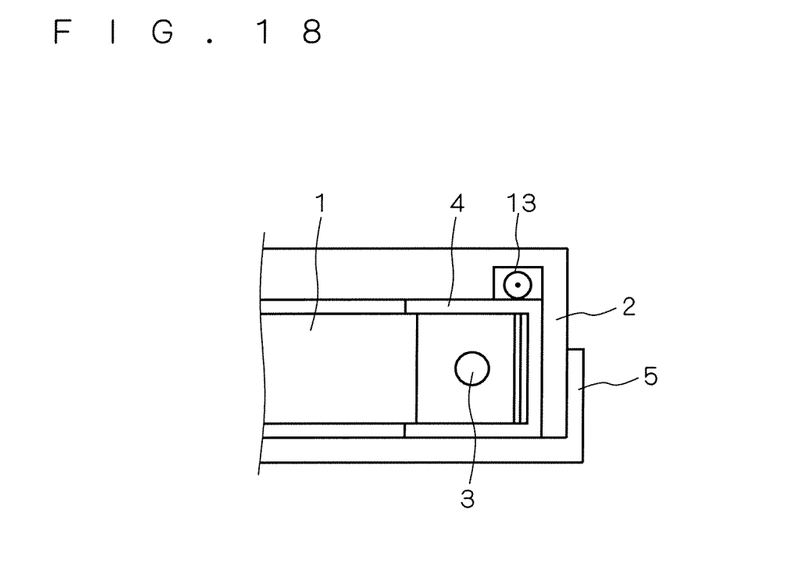
FIG. 18 is a partial sectional view of the planar light source according to the third preferred embodiment.

The reflective sheet 13 is not necessarily required to be arranged on the rear surface of the window 10. As an example, as seen from the reflector 4 shown in FIG. 17, a slit 14 allowing the reflective sheet 13 to pass therethrough may be provided in the upper surface of the reflector 4. In this case, the reflective sheet 13 is arranged on the front surface of the window 10 (between the reflector 4 and the cold cathode fluorescent lamp 3) as shown in FIG. 18.

As discussed, in the planar light source of the third preferred embodiment, the ratio of the area of the window 10 occupied by the reflective sheet 13 is chanted by winding the reflective sheet 13 to thereby control the amount of reflected light. Thus the range of brightness control can be broadened.

The planar light source according to the first, second and third preferred embodiments may be equipped with a liquid crystal panel thereon to be used as a backlight. Such a planar light source is allowed to provide a sufficiently wide range of brightness control even when it is used in a shipboard, in a car-mounted system and the like.

In the description of the first, second and third preferred embodiments, the cold cathode fluorescent lamp 3 is used as a light source part. Alternatively, other light sources such as an LED (light emitting diode) may be used as a light source part.

While the invention has been shown and described in detail, the foregoing description is in all aspects illustrative and not restrictive. It is therefore understood that numerous modifications and variations can be devised without departing from the scope of the invention.

What is claimed is:

1. A planar light source comprising:
   a light source part;
   a light guide part for guiding light emitted from said light source part to form planar emission of said light; and
   a reflector with a rear side portion and two side portions surrounding the light source except at a face where light from the light source directly enters the light guide part, and said reflector for reflecting light emitted from said light source part to allow said light to enter said light guide part, said reflector including a member at the rear side portion capable of controlling the amount of reflected light from the reflector, and the member is configured to control an amount of reflected light from at least two surfaces,
   wherein said member for controlling the amount of reflected light comprises:
   slits formed at least on one surface of said reflector; and
   a reflective plate arranged on the rear surface of said reflector, said reflective plate having light absorbers capable of overlapping said slits, and
   wherein said reflective plate is moved to control the amount of reflected light.

2. The planar light source according to claim 1,
   wherein said reflective plate is formed by the same material as that of said reflector, or formed by a material having substantially the same reflection characteristic as that of said reflector.

3. A planar light source comprising:
   a light source part;
   a light guide part for guiding light emitted from said light source part to form planar emission of said light; and
   a reflector with a rear side portion and two side portions surrounding the light source except at a face where light from the light source directly enters the light guide part, and said reflector for reflecting light emitted from said light source part to allow said light to enter said light guide part, said reflector including a member at the rear side portion capable of controlling the amount of reflected light from the reflector, and the member is configured to control an amount of reflected light from at least two surfaces,
   wherein said member for controlling the amount of reflected light comprises:
   first slits formed at least on one surface of said reflector; and
   a reflective plate arranged on the front surface or on the rear surface of said reflector, said reflective plate having second slits capable of overlapping said first slits, and
   wherein said reflective plate is moved to control the amount of reflected light.

4. A planar light source comprising:
   a light source part;
   a light guide part for guiding light emitted from said light source part to form planar emission of said light; and
   a reflector for reflecting light emitted from said light source part to allow said light to enter said light guide part, said reflector having a member for controlling the amount of reflected light capable of controlling the amount of reflected light;
   wherein said member for controlling the amount of reflected light comprises:
   slits formed at least on one surface of said reflector; and
   a reflective plate arranged on a rear surface of said reflector, said reflective plate having light absorbers capable of overlapping said slits, and
   wherein said reflective plate is moved to control the amount of reflected light.

5. The planar light source according to claim 4,
   wherein said reflective plate is formed by the same material as that of said reflector, or formed by a material having substantially the same reflection characteristic as that of said reflector.

6. A planar light source comprising:
   a light source part;
   a light guide part for guiding light emitted from said light source part to form planar emission of said light; and
   a reflector for reflecting light emitted from said light source part to allow said light to enter said light guide part, said reflector having a member for controlling the amount of reflected light capable of controlling the amount of reflected light;
   wherein said member for controlling the amount of reflected light comprises:
   first slits formed at least on one surface of said reflector; and
   a reflective plate arranged on a front surface or on a rear surface of said reflector, said reflective plate having second slits capable of overlapping said first slits, and
   wherein said reflective plate is moved to control the amount of reflected light.

7. A planar light source, comprising:
   a light source part;
   a light guide part for guiding light emitted from said light source part to form planar emission of said light; and
   a reflector with a rear side portion and two side portions surrounding the light source except at a face where light from the light sourec directly enters the light guide part, and said reflector for reflecting light emitted from said light source part to allow said light to enter said light guide part, said reflector including a member at the rear side portion capable of controlling the amount of reflected light from the reflector;

wherein said member for controlling the amount of reflected light comprises:
  slits formed at least on one surface of said reflector; and
  a reflective plate arranged on the rear surface of said reflector, said reflective plate having light absorbers capable of overlapping said slits, and
  wherein said reflective plate is moved to control the amount of reflected light.

8. The planar light source according to claim 7, wherein said reflective plate is formed by the same material as that of said reflector, or formed by a material having substantially the same reflection characteristic as that of said reflector.

9. A planar light source, comprising:
a light source part;
a light guide part for guiding light emitted from said light source part to form planar emission of said light; and
a reflector with a rear side portion and two side portions surrounding the light source except at a face where light from the light source directly enters the light guide part, and said reflector for reflecting light emitted from said light source part to allow said light to enter said light guide part, said reflector including a member at the rear side portion capable of controlling the amount of reflected light from the reflector;
wherein said member for controlling the amount of reflected light comprises:
  first slits formed at least on one surface of said reflector; and
  a reflective plate arranged on the front surface or on the rear surface of said reflector, said reflective plate having second slits capable of overlapping said first silts, and
  wherein said reflective plate is moved to control the amount of reflected light.

* * * * *